(12) United States Patent
Schädler et al.

(10) Patent No.: US 11,680,641 B2
(45) Date of Patent: Jun. 20, 2023

(54) METHOD FOR MOUNTING AN ANNULAR SEALING ELEMENT

(71) Applicants: thyssenkrupp Presta AG, Eschen (LI); thyssenkrupp AG, Essen (DE)

(72) Inventors: Sebastian Schädler, Triesenberg (LI); Andreas Münster, Weissensberg (DE); Manuel Stadelmann, Sulz (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 458 days.

(21) Appl. No.: 16/979,231

(22) PCT Filed: Mar. 29, 2019

(86) PCT No.: PCT/EP2019/057970
§ 371 (c)(1),
(2) Date: Sep. 9, 2020

(87) PCT Pub. No.: WO2019/192927
PCT Pub. Date: Oct. 10, 2019

(65) Prior Publication Data
US 2021/0010597 A1    Jan. 14, 2021

(30) Foreign Application Priority Data
Apr. 4, 2018   (DE) .................... 10 2018 205 081.3

(51) Int. Cl.
*B23P 19/08*   (2006.01)
*B23P 19/04*   (2006.01)
(Continued)

(52) U.S. Cl.
CPC ........... *F16J 15/104* (2013.01); *B23P 19/047* (2013.01); *B23P 19/084* (2013.01); *F16C 33/00* (2013.01);
(Continued)

(58) Field of Classification Search
CPC ....... B23P 19/084; B23P 19/04; B23P 19/047; B23P 19/08; F16J 15/104; F16C 33/00;
(Continued)

(56) References Cited

U.S. PATENT DOCUMENTS

2017/0209968 A1* 7/2017 Mizumoto .............. B23P 19/02

FOREIGN PATENT DOCUMENTS

| CN | 1943975 A | * | 4/2007 |
| CN | 1943975 A |   | 4/2007 |

(Continued)

OTHER PUBLICATIONS

English Translation of International Search Report issued in PCT/EP2019/057970, dated May 29, 2019.
(Continued)

*Primary Examiner* — Bayan Salone
(74) *Attorney, Agent, or Firm* — thyssenkrupp North America, LLC (57) ABSTRACT

A method for assembling an annular seal element, formed by a sealing cord which runs around an opening on a seal receptacle which runs around on the outside of a component. The method includes introducing two assembly fingers into the opening of the annular seal element, stretching the annular seal element by moving the assembly fingers apart from one another, with the formation of a cord portion of the sealing cord, the cord portion being freely tensioned between the assembly fingers, placing the freely tensioned cord portion onto the seal receptacle in a contact region, applying the annular seal element, by way of its opening, onto the seal receptacle, and removing the assembly fingers from the annular seal element. The assembly fingers are moved so as to follow the profile of the seal receptacle, to travel around the seal receptacle in opposite directions.

10 Claims, 6 Drawing Sheets

(51) Int. Cl.
*F16J 15/10* (2006.01)
*F16C 33/00* (2006.01)
*F16C 33/72* (2006.01)
*B25J 9/16* (2006.01)
*B25B 27/14* (2006.01)
*B25B 27/00* (2006.01)
*B25J 11/00* (2006.01)

(52) U.S. Cl.
CPC .............. *F16C 33/72* (2013.01); *B23P 19/04* (2013.01); *B23P 19/08* (2013.01); *B25B 27/0028* (2013.01); *B25B 27/14* (2013.01); *B25J 9/1682* (2013.01); *B25J 11/005* (2013.01)

(58) Field of Classification Search
CPC ........ F16C 33/72; B25J 9/1682; B25J 11/005; B25B 27/14; B25B 27/0028
See application file for complete search history.

(56) References Cited

FOREIGN PATENT DOCUMENTS

| | | | | |
|---|---|---|---|---|
| CN | 204036391 U | * | 12/2014 | |
| CN | 204036391 U | | 12/2014 | |
| CN | 204893821 U | * | 12/2015 | |
| CN | 204893821 U | | 12/2015 | |
| CN | 106737378 A | | 5/2017 | |
| CN | 106737378 A | * | 5/2017 | |
| CN | 107073659 A | * | 8/2017 | ............ B23P 19/02 |
| CN | 107073659 A | | 8/2017 | |
| DE | 3718386 A1 | * | 12/1988 | |
| DE | 3718386 A1 | | 12/1988 | |
| DE | 38 16 593 A | | 11/1989 | |
| DE | 10 2006 044 748 A | | 4/2008 | |
| DE | 20 2014 106 214 U | | 3/2016 | |
| DE | 202014106213 U1 | | 3/2016 | |
| DE | 202014106213 U1 | * | 4/2016 | |
| EP | 2025479 A1 | | 2/2009 | |
| EP | 2025479 B1 | * | 9/2010 | ............ B23P 19/084 |
| JP | 2000296424 A | | 10/2010 | |
| JP | 2015139840 A | * | 8/2015 | |
| JP | 2015139840 A | | 8/2015 | |

OTHER PUBLICATIONS

Wossner J F: "Flexible O-Ring-Montage in Stirnflachennuten", Oct. 22, 1993.

* cited by examiner

METHOD FOR MOUNTING AN ANNULAR SEALING ELEMENT

CROSS REFERENCE TO RELATED APPLICATIONS

This application is a U.S. National Stage Entry of International Patent Application Serial Number PCT/EP2019/057970, filed Mar. 29, 2019, which claims priority to German Patent Application No. DE 10 2018 205 081.3, filed Apr. 4, 2018, the entire contents of both of which are incorporated herein by reference.

FIELD

The present disclosure generally relates to assembling of an annular seal element.

BACKGROUND

To seal a component within a mating component which surrounds the latter externally, it is known to insert an annular seal element, such as, for example, an O-ring which is formed by an endless ring cord or sealing cord, which encloses an opening in an annular manner and is composed of an elastic sealing material, and is therefore also called a ring cord seal, between the outer periphery of the component and the inner periphery of said mating component. The component comprises a seal receptacle which runs around on an outer lateral surface, for example a peripheral, outwardly open groove whose profile corresponds to the opening cross section of the O-ring. For assembly, the component can be plugged through the opening of the O-ring until the O-ring encloses the component in the region of the seal receptacle. With the seal assembled in this way, the component is subsequently inserted, by way of its seal receptacle, into the mating component, with the sealing cord filling the peripheral ring gap between the component and the mating component in an elastically sealing manner.

A method for the automated assembly of an O-ring on a cylindrical component is described in DE 2006 044 748 A1. Said method provides for two elongate pin-shaped assembly fingers, referred to in said document as joining needles, to be jointly inserted with their free ends into the opening of an O-ring, and then moved apart from one another transversely with respect to the introduction direction, as a result of which the O-ring is spread out or stretched to give an oval form. As a result, a freely tensioned cord portion is formed between the assembly fingers, said cord portion being placed from the outside onto the seal receptacle in a contact region. This is effected in that the component is pivoted, in a relative movement, into the open cross section of the O-ring stretched between the assembly fingers. In this way, the O-ring is pulled over the component until the entire seal receptacle dips completely into the O-ring. Finally, the assembly fingers are pulled out counter to the insertion direction between the O-ring and the component.

The known automated assembly of the annular seal element or O-ring on a component, compared with a manual assembly, is advantageous for an efficient manufacturing operation. However, it is disadvantageous that, during stretching and application, the O-ring has to be stretched relatively far by the assembly fingers, and, as a result of the prescribed movement sequence, the O-ring may be subject to undesired mechanical stressing, twisting or torsion during assembly on the seal receptacle.

Thus, a need exists for an improved automated method for assembling an annular seal element on a seal receptacle which runs around on the outside of a component, said method making reduced mechanical stressing and deformation during the assembly possible.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a method for assembling an annular seal element, which is formed by a sealing cord which runs around an opening, on a seal receptacle which runs around on the outside of a component,
comprising the steps of:
introducing two assembly fingers into the opening of the annular seal element,
stretching the annular seal element by moving the assembly fingers apart from one another, with the formation of a cord portion of the sealing cord, said cord portion being freely tensioned between the assembly fingers,
placing the freely tensioned cord portion onto the seal receptacle in a contact region,
applying the annular seal element, by way of its opening, onto the seal receptacle,
removing the assembly fingers from the annular seal element.

According to the invention, for a method for assembling an annular seal element, which is formed by a sealing cord which runs around an opening, on a seal receptacle which runs around on the outside of a component, comprising the steps of:
introducing two assembly fingers into the opening of the annular seal element,
stretching the annular seal element by moving the assembly fingers apart from one another, with the formation of a cord portion of the sealing cord, said cord portion being freely tensioned between the fingers, placing the freely tensioned cord portion onto the seal receptacle in a contact region, applying the annular seal element, by way of its opening, onto the seal receptacle, removing the assembly fingers from the annular seal element, it is proposed that, for the application of the annular seal element, the assembly fingers are moved so as to follow the profile of the seal receptacle, in order to travel around the seal receptacle in opposite directions.

The annular seal element is preferably a round sealing ring and can be configured in the form of a shaft sealing ring and particularly preferably in the form of an O-ring, which is a closed ring with round cross section. Furthermore, it is conceivable and possible for the annular seal element to be able to be configured, in cross section, as a regular or irregular polygon. For simplicity, the embodiments of the annular sealing element are subsumed below simply under the term O-ring.

In the method according to the invention, the assembly fingers are moved along the seal receptacle, with the sealing cord being positioned, in each case behind the assembly finger, from the outside on the seal receptacle. During the placing-on operation, the contact region is located between the assembly fingers. In order to travel around in opposite directions, as seen from the contact region, the one finger is moved in one direction continuously along the seal receptacle, and the other finger in the opposite direction, such that the periphery of the component in the region of the seal receptacle is at least partially traveled around by the assembly fingers. In this case, during the application operation, the annular seal element is preferably constantly stretched between the contact region, in which the annular seal element already lies against the seal receptacle and which is increased continuously during the traveling-around operation, and the two assembly fingers.

According to the invention, the sealing cord is continually monitored by the assembly fingers and is positioned correctly on the seal receptacle relative to the component. This is achieved in that, during the application operation, not only does the stretched O-ring as a whole move relative to the component, like in the prior art, whereas the assembly fingers remain in the stretched position, but additionally the assembly fingers are moved preferably continuously relative to one another, depending on the position of the O-ring relative to the seal receptacle. The relative movement of the assembly fingers can follow the profile of the seal receptacle in space. As a result, it is possible to avoid an excessively wide initial stretching for adaptation to the component cross section. It is also possible to largely prevent undesired and potentially function-impairing deformation of the O-ring. As a result, the mechanical stressing of the sealing cord during the assembly can be reduced, and the sealing function can be better ensured.

In addition, a further advantage is that an O-ring can be assembled not only on a cylindrical component but also on a component with asymmetrical or irregular cross section in the region of the seal receptacle. The adaptation of the methods known from the prior art to applications of this kind is not possible or is possible only with great effort.

An advantageous configuration is that, during the traveling-around operation, the assembly fingers are moved at a substantially constant spacing from the seal receptacle. As a result, the sealing cord is brought toward, and placed on, the seal receptacle at a uniform angle. The mechanical stress of the sealing cord during the assembly can be evened out, even in the case of irregular or asymmetrical component cross sections. Deformation can likewise be reduced.

Provision can be made for the assembly fingers to be attached to robot manipulators which can be moved, independently of one another, along multiple axes. Multi-axis robot manipulators are known for example in the form of robot arms, and permit a free multi-axis, possibly separate or simultaneous translational and/or rotational movement in space of an assembly finger attached thereto. As a result of the independent movability, the assembly fingers can be moved relative to one another for the stretching of the O-ring, and in particular also when traveling around the seal receptacle. Synchronous movement makes it possible, for example, to bring a stretched O-ring closer in order to place it on the seal receptacle.

A particular advantage is that, as a result of corresponding programming of the robot manipulators, an adaptation to very different O-rings and component geometries is possible with little effort. As a result, a universal use of an assembly installation for different constructions and embodiments of components and O-rings is also possible, such that an advantageous, efficient manufacturing operation can be realized.

The assembly fingers are preferably of elongate and pin-shaped configuration, and can be cylindrical with circular cross section.

Provision can be made for at least one assembly finger to have a retaining device in which the sealing cord is positioned during the stretching and traveling-around operations. The retaining device can for example comprise a retaining groove which preferably runs around the assembly finger and in which the O-ring can preferably be positioned and retained in a positively locking manner. The retaining device makes it possible to retain the O-ring in an unambiguously defined position along the assembly finger, such that, in the stretched state, the O-ring is positioned unambiguously on the assembly fingers, and consequently, taking the positioning of the assembly fingers as a basis, the placing-on operation can be simplified. A further advantage is that, during the traveling-around operation, the assembly fingers can be moved in such a way that the position of the retaining device, for example of a retaining groove, follows the profile of the seal receptacle, preferably with a substantially constant spacing and angle between the retaining device and the contact point at which the sealing cord continually contacts the seal receptacle during the traveling-around operation. A peripheral retaining groove can be of simple configuration and can be configured to receive the sealing cord in a positively locking manner. As a result of the fact that the retaining groove can be configured to run around the assembly finger, during the traveling-around operation, the sealing cord is positioned and guided in a reliable and precise manner in any orientation between assembly finger and O-ring assumed in the process. If the assembly fingers are of cylindrical configuration, the retaining device can comprise, as retaining groove, a peripheral, outwardly open radial groove. Compared with the aforementioned prior art which merely discloses smooth assembly fingers, the retaining device makes possible a better defined positioning of the O-ring. Furthermore, the sealing cord can also be positioned on a seal receptacle extending three-dimensionally in space rather than parallel to a receiving plane.

A development of the method provides that, for removal, the assembly fingers are tilted relative to the seal receptacle and the annular seal element. The removal is effected as soon as the periphery of the seal receptacle has for the most part been traveled around, such that the O-ring already completely surrounds the seal receptacle, or, expressed differently, the component is located completely within the opening of the O-ring. The contact region then extends over the already traveled-around peripheral region, in which the sealing cord has been positioned so as to lie against the seal receptacle, and is freely tensioned in an elastic manner between the assembly fingers merely in a remaining portion which is smaller relative thereto. The assembly fingers can position said remaining portion relative to the still free remaining periphery of the seal receptacle so as to follow said periphery, such that, for conclusion of the assembly, it is necessary merely to move out the assembly fingers between the sealing ring and the component. According to the invention, it is proposed that the assembly fingers are virtually pivoted or tilted out, as a result of a rotary movement about a tilt axis which extends parallel to a portion in the profile of the O-ring or lies in an assembly plane which is defined, by the profile of the sealing cord, between the assembly fingers and the contact region. Expressed differently, the assembly fingers are levered out of the interspace between the seal receptacle and the O-ring. One advantage compared with the prior art, in which the assembly fingers are pulled out in a translational manner perpendicularly with respect to said assembly plane, is that it is possible for both incorrect positioning of the O-ring relative to the seal receptacle and undesired stressing and deformation of the sealing cord to be largely avoided.

The tilting operation for the removal of the assembly fingers can be advantageously realized in the embodiment as mentioned above, in which the assembly fingers are attached to robot manipulators which can be moved, independently of one another, along multiple axes. The tilting movement can be realized with little effort as a result of programming of the movement path of the robot manipulators.

The seal receptacle can be formed by a groove which runs around on the outside of the component. The outwardly open groove runs around the component and encloses the latter with its profile, and is configured, for example in the case of a cylindrical component, in the form of a radial groove which runs around on the outside of the shell. The open groove cross section can preferably be matched to the form and dimensions of the seal cross section of the sealing cord.

During the stretching operation, the annular seal element can extend substantially parallel to a stretching plane which has a stretching normal direction. Before the placing-on operation, if the O-ring has been stretched between the assembly fingers, said O-ring has, if the assembly fingers have a circular cross section, the O-ring forms an oval lying in the stretching plane.

The seal receptacle can extend substantially parallel to a receiving plane which has a receiving normal direction. A receiving groove of the seal receptacle, said groove running around the component, can be configured for example in the form of a radial groove which runs parallel to a radial plane.

Before the placing-on of the freely tensioned cord portion, the stretching plane can be inclined relative to the receiving plane, in order to bring the inner side of the cord into contact with the seal receptacle in the contact region. During the placing-on operation, the O-ring is tilted obliquely relative to the profile of the seal receptacle. The rotary movement for the tilting operation and the translational movement for the placing-on operation can be favorably brought about using a robot manipulator already mentioned above.

During the traveling-around operation, it is possible for the stretching plane to be tilted toward the receiving plane. During the placing-on operation, the O-ring is oriented parallel to the stretching plane, which is inclined relative to the receiving plane. During the traveling-around operation, the stretching plane—preferably continuously in a rotary or tilting movement synchronous to the traveling-around operation—can be oriented parallel to the receiving plane, such that upon conclusion of the traveling-around operation the stretching plane lies in the receiving plane. A movement sequence of this kind makes it possible to position the O-ring on the seal receptacle in a better way than in the prior art, and can be favorably implemented by means of the robot manipulators described above.

The component can for example be a housing of a motor vehicle steering system, for example a transmission housing or a sensor housing, which can preferably have, as seal receptacle, a radial groove which runs around on the outside. In the region of the seal receptacle, a connection housing, a housing cover or the like can be placed, with the O-ring sealing the ring gap with respect to the housing. The cross section of the housing can be round, or else oval or polygonal. The method according to the invention then forms a method for assembling a motor vehicle steering system.

The use of the method according to the invention for assembling a motor vehicle steering system is particularly advantageous, since, firstly, there are very high requirements for an efficient and cost-effective manufacturing operation and, secondly, the interaction of the components is highly relevant to safety, such that particular importance is attached to the optimal assembly of the O-ring.

Figure 1:
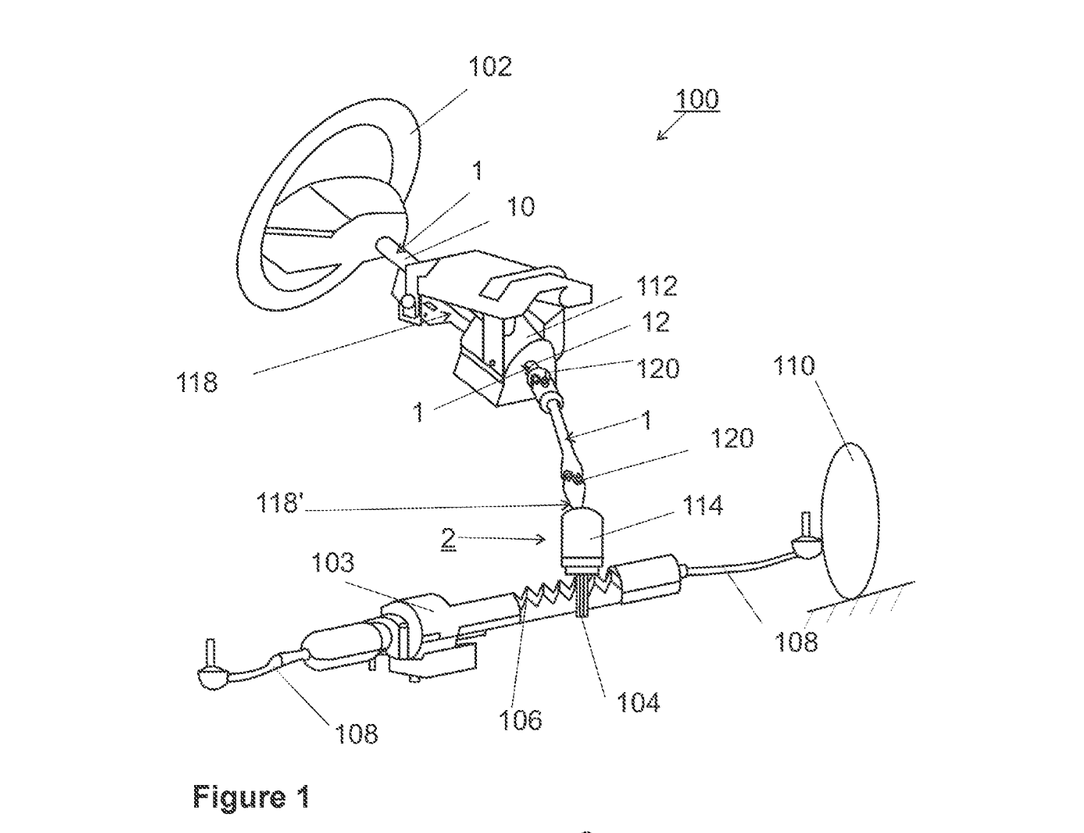
FIG. 1 is a schematic perspective view of a motor vehicle steering system.

FIG. 1 schematically illustrates a motor vehicle steering system 100, wherein a driver can input a corresponding steering torque (steering moment) as steering command into a steering shaft 1 using a steering wheel 102. The steering moment is transmitted via the steering shaft 1 to a steering pinion 104, which meshes with a rack 106, which then in turn transmits the prescribed steering angle to the steerable wheels 110 of the motor vehicle by means of a displacement of the track rods 108.

An electrical power assistance means may be provided in the form of a power assistance means 112 coupled at the input side to the steering shaft 1, of a power assistance means 114 coupled to the pinion 104, and/or of a power assistance means 116 coupled to the rack 106. The respective power assistance means 112, 114 or 116 couples an auxiliary torque into the steering shaft 1 and/or the steering pinion 104 and/or an auxiliary force into the rack 106, whereby the driver is assisted in performing steering work. The three different power assistance means 112, 114 and 116 illustrated in FIG. 1 show possible positions for the arrangement thereof.

Normally, only a single one of the positions shown is occupied by a power assistance means 112, 114 or 116. The auxiliary torque or the auxiliary force which is to be imparted by the respective power assistance means 112, 114 or 116 for the purpose of assisting the driver is determined to take into consideration a steering moment input by the driver and detected by a torque sensor 118. Alternatively or in combination with the introduction of the auxiliary torque, an additional steering angle can be introduced into the steering system by the power assistance means 112, 114, 116, said additional steering angle being added to the steering angle imparted by the driver via the steering wheel 102.

The steering shaft 1 comprises, at the input side, an input shaft 10 connected to the steering wheel 102 and, at the output side, an output shaft 12 connected to the rack 106 via the steering pinion 104. The input shaft 10 and the output shaft 12 are coupled to one another in a rotationally elastic manner by way of a torsion bar 119 (see FIG. 3), which is not shown in FIG. 1. Thus, a torque input into the input shaft 10 by a driver via the steering wheel 102 always leads to a relative rotation of the input shaft 10 with respect to the output shaft 12 whenever the output shaft 12 does not rotate exactly synchronously with respect to the input shaft 10. This relative rotation between the input shaft 10 and the output shaft 12 can be measured by way of a rotational angle sensor and, correspondingly, on the basis of the known torsional stiffness of the torsion bar, a corresponding input torque relative to the output shaft 12 can be determined. In this way, through the determination of the relative rotation between the input shaft 10 and the output shaft 12, the torque sensor 118 is formed. Such a torque sensor 118 is known in principle and can for example be realized by means of an electromagnetic sensor arrangement, as described further below, or by another means of measurement of the relative rotation.

Correspondingly, a steering moment imparted to the steering shaft 1 or to the input shaft 10 by the driver via the steering wheel 102 will give rise to the introduction of an auxiliary torque by one of the power assistance means 112, 114, 116 only if the output shaft 12 is rotated relative to the input shaft 10 counter to the torsional resistance of the torsion bar.

The torque sensor 118 can also alternatively be arranged at the position 118', wherein then the division of the steering shaft 1 into input shaft 10 and output shaft 12 and the rotationally elastic coupling by way of the torsion bar are correspondingly present at a different position in order, from the relative rotation of the output shaft 12 coupled to the input shaft 10 via the torsion bar, to be able to determine a relative rotation and thus correspondingly an input torque and/or an auxiliary torque to be introduced.

The steering shaft 1 as per FIG. 1 furthermore comprises at least one cardanic joint 120, by means of which the profile of the steering shaft 1 in the motor vehicle can be adapted to the spatial conditions.

Figure 2:
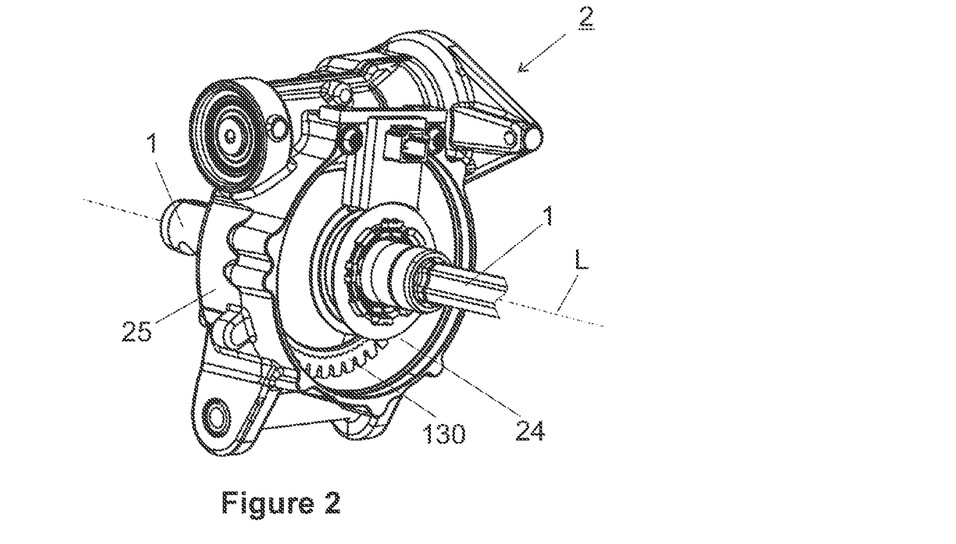
FIG. 2 is a perspective view of a transmission (steering assistance transmission) of a motor vehicle steering system as per FIG. 1.
Figure 3:
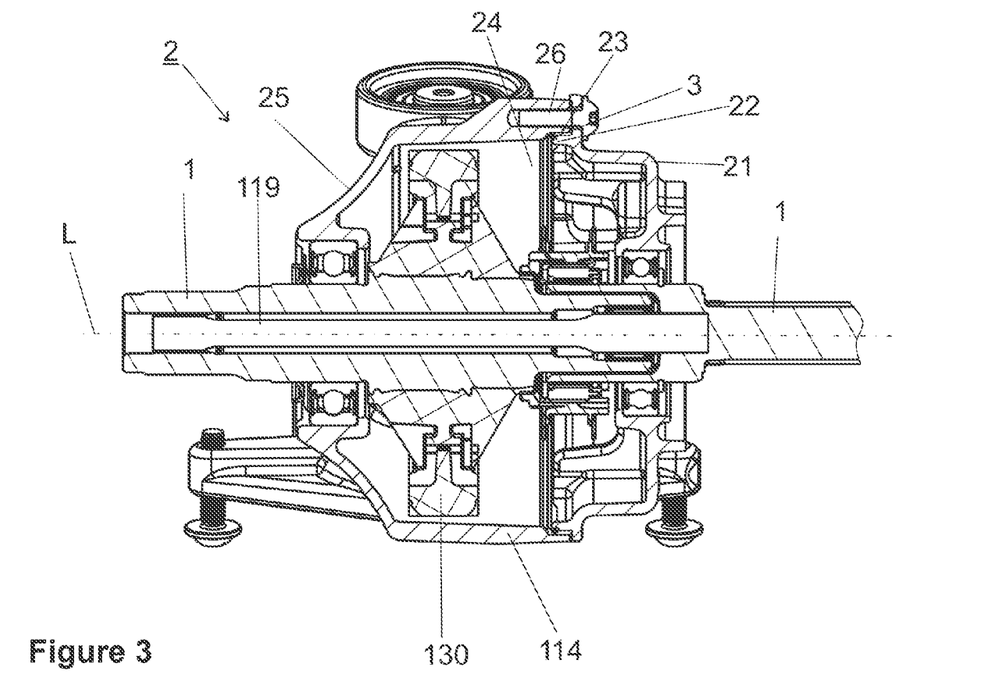
FIG. 3 is a longitudinal sectional view through the transmission as per FIG. 2.

In the example illustrated, the power assistance means 114 comprises a transmission 2, which forms a steering assistance transmission, and is illustrated in FIG. 3 in longitudinal section along the longitudinal axis L of the steering shaft 1 and in FIG. 2 in a perspective view in a partially assembled state.

The transmission 2 comprises a component 21, which forms a first housing part which comprises a shoulder 22 which, in the illustration of FIG. 3, is directed toward the left in the axial direction of the longitudinal axis L, on which shoulder there is configured a groove 23 in the form of an outwardly open groove, that is to say a groove which is radially open with respect to the longitudinal axis L, said groove running around the component 21 with respect to the longitudinal axis L.

The component 21 engages by way of the shoulder 22 into a corresponding housing opening 24 of a second housing part 25.

In the closed state shown in FIG. 3, the housing parts 21 and 25 are connected to one another by fastening elements 26, for example screws or bolts. A radially peripheral gap is located between the groove 23 and the inner side of the housing opening 24. An O-ring 3 is inserted into the peripheral groove 23 in a positively locking manner and in this case projects to such an extent radially that said O-ring lies radially from the inside against the inner side of the housing opening in a sealing manner.

FIGS. 2 and 3 show how the steering shaft 1 is mounted in the housing parts 21 and 25 so as to be rotatable about the longitudinal axis L and passes through the housing. A transmission wheel 130, for example a worm wheel of the power assistance means 114, which is accommodated in the housing in a sealed manner, is attached on the steering shaft 1 in a rotationally fixed manner.

FIGS. 4 to 12 schematically illustrate individual steps of the assembly of the O-ring 3 in the groove 23 of the component 21. The component 21 is schematically shown in an axial view in the direction of the longitudinal axis L, specifically corresponding to a view from the left as per FIG. 3.

Figure 4:
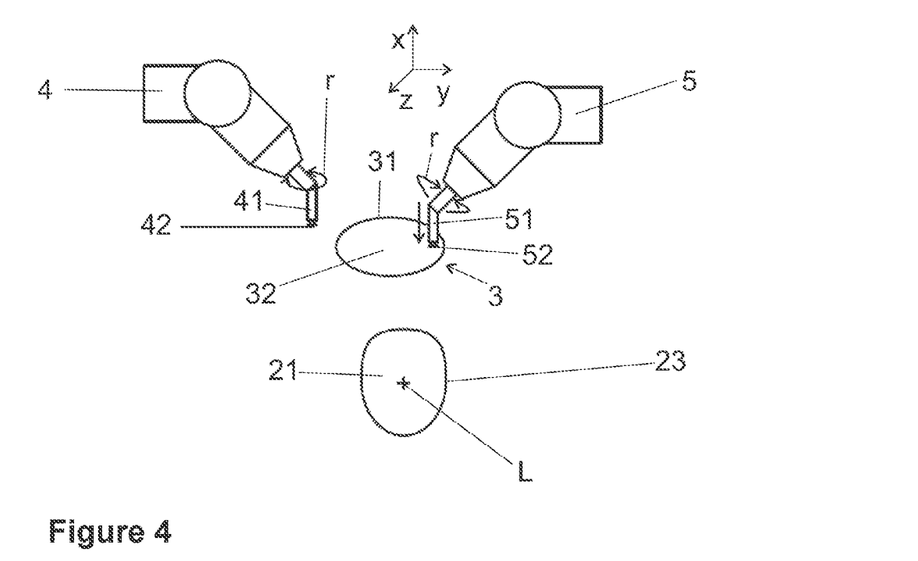
FIGS. 4-12 are schematics of successive method steps of the assembly of an O-ring on a transmission as per FIGS. 2 and 3.

The O-ring 3 is formed by a sealing cord 31 composed of a rubber-elastic material, said cord running around an opening 32.

An assembly finger 41 and 51, which is configured in the form of a cylindrical pin and in each case comprises, in the front region, a peripheral retaining groove 42, 52 as retaining device, is in each case fastened to a robot manipulator 4 and 5. The robot manipulators 4, 5 permit a multi-axis movement of the assembly fingers 41, 51 in space, specifically at least translationally in the x, y and z directions, and also rotationally about axes of rotation r which, in the example, are angled in relation to the longitudinal extent of the assembly fingers 41, 51.

Figure 5:
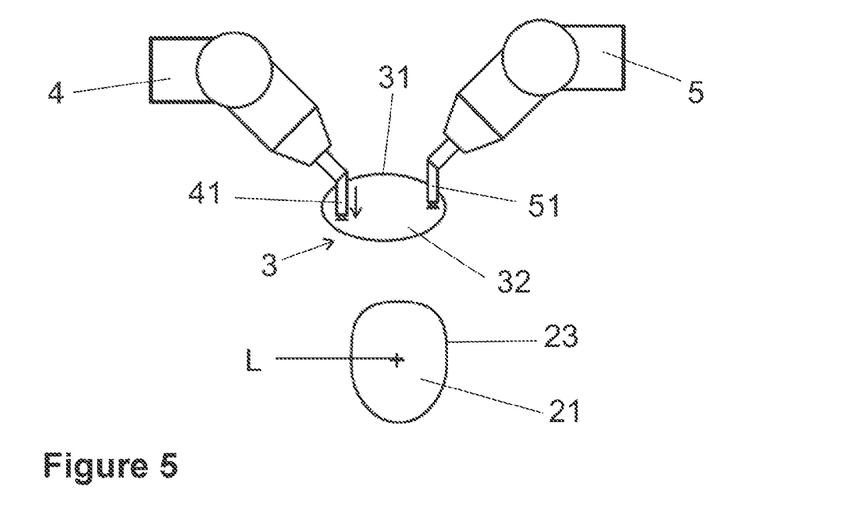

FIG. 4 shows how the one assembly finger 51 is dipped in an introduction direction into the opening 32 of the O-ring 3, and subsequently the other assembly finger 41, such that, as per FIG. 5, both assembly fingers 41, 51 are located in the opening, specifically adjacently at such a distance that they initially do not touch the sealing cord 31.

Figure 6:
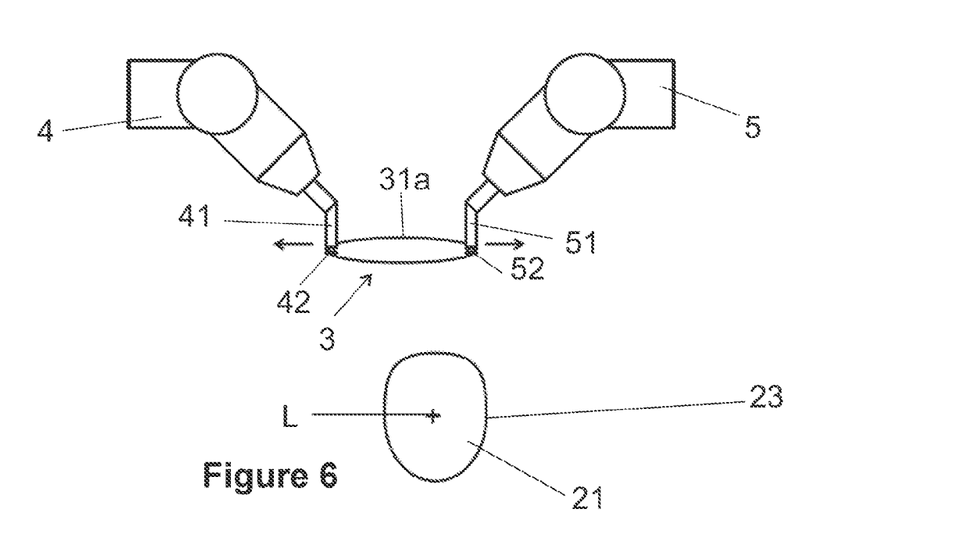

Subsequently, as shown in FIG. 6, the assembly fingers 41, 51 are moved apart from one another in the direction of the arrows, that is to say are distanced relative to one another by the robot manipulators 4, 5 until the sealing cord 31 is received in the retaining grooves 42, 52 in a positively locking manner. In this case, the O-ring 3 is stretched in an oval-shaped manner in such a way that at least one freely tensioned cord portion 31a is formed between the assembly fingers 41, 51.

The O-ring 3 is now stretched in a stretching plane which is inclined relative to the receiving plane, parallel to which receiving plane the groove 23 runs and the normal direction of which is identical to the longitudinal axis L.

Figure 7:
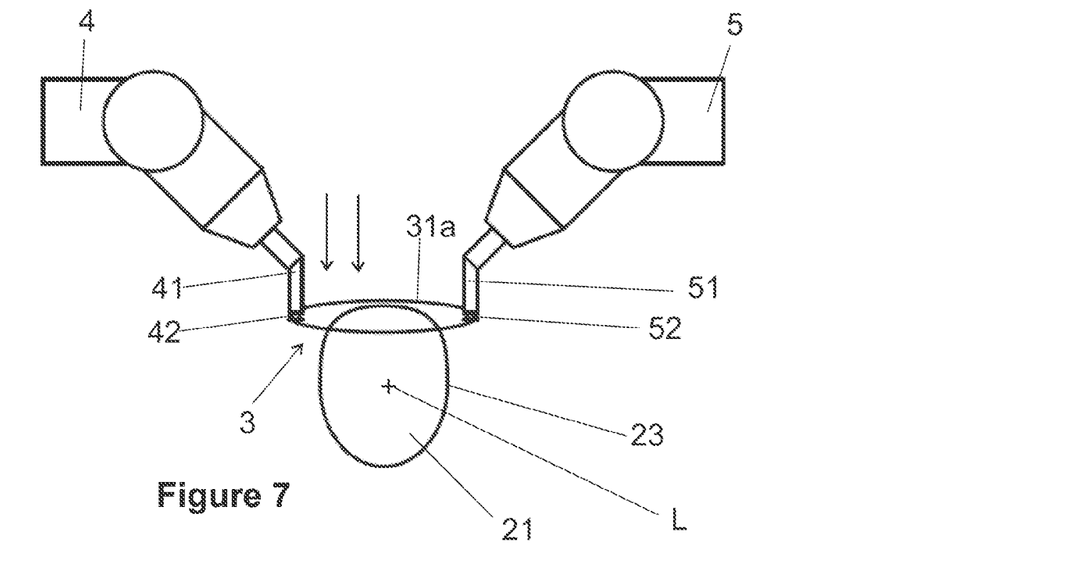
Figure 8:
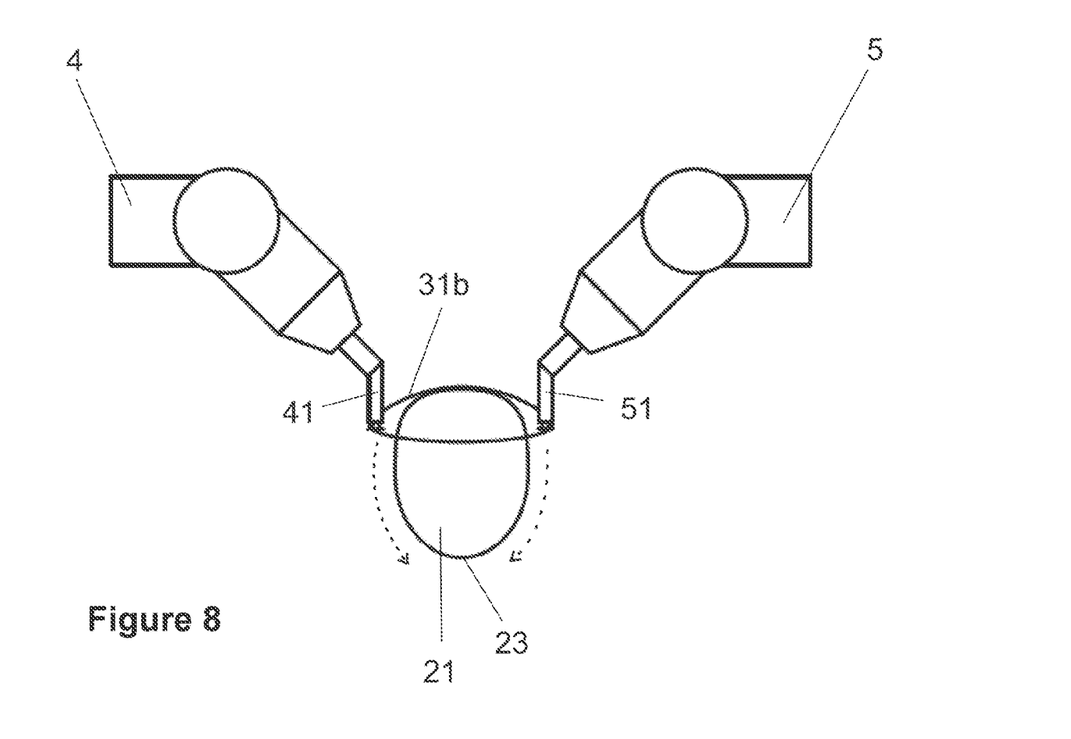

Subsequently, in the stretched state, the O-ring 3 is moved in a translational and transverse manner toward the longitudinal axis L as a result of synchronized movement, as shown in FIG. 7, until the sealing cord 31, starting with the inner side of the cord portion 31a, contacts the groove 23 in a contact region 31b and is in this case inserted from the outside into said groove, as illustrated in FIG. 8.

FIG. 8 shows the placing of the O-ring 3 onto the seal receptacle 23.

Figure 9:
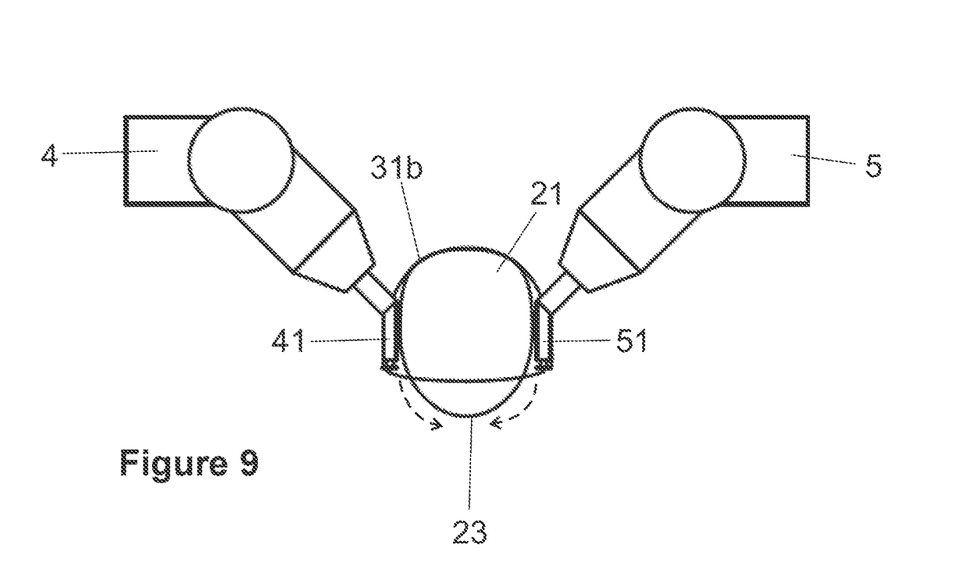
Figure 10:
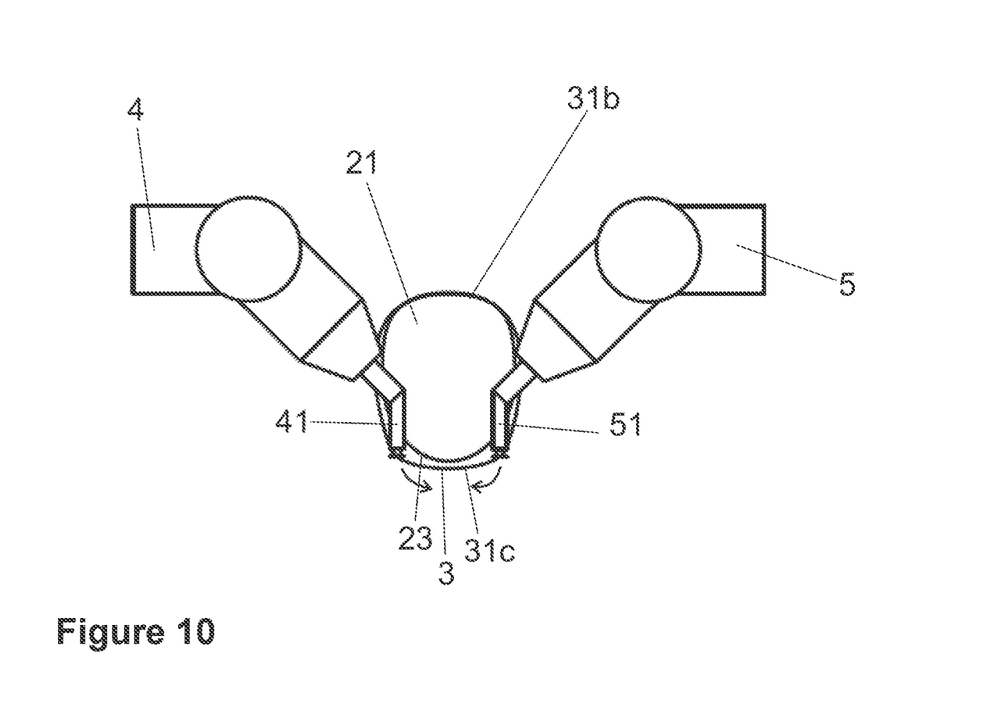

Hereafter, the assembly fingers 41, 51 are moved relative to the component 21 so as to follow the profile of the groove 23 at a spacing, as indicated by the dashed arrows in FIGS. 8 and 9. As a result, the groove 23 is traveled around in opposite directions. As a result, the contact region 31b, in which the sealing cord 31 has been inserted in the groove 23 in a positively locking manner, is continually increased over the periphery of the component 21 until the peripheral groove 23 is located completely in the opening 32 of the O-ring 3, as illustrated in FIG. 10. FIG. 10 shows the end point during the traveling-around operation, with the free cord portion 31c which remains between the assembly fingers 41, 51 being retained at a spacing parallel to the groove 23.

During the phases shown in FIGS. 8 to 10, it is possible to execute a simultaneous tilting movement of the robot manipulators 4 and 5 in order to pivot the stretching plane of the O-ring 3 in the direction of the receiving plane of the groove 23 until the two planes lie parallel to each other in the state shown in FIG. 10.

Figure 11:
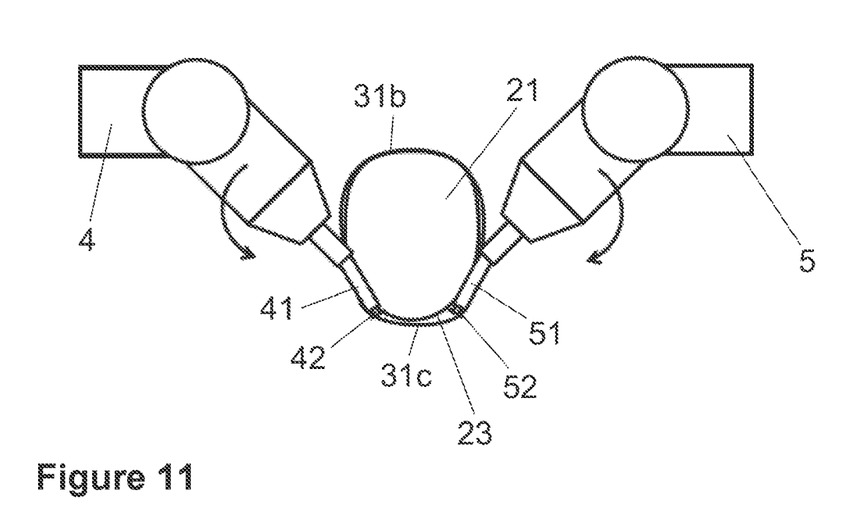

For removal from the O-ring 3, the assembly fingers 41, 51 are tilted in an oppositely rotating manner about the axes of rotation r which lie parallel to an assembly plane, which is defined, by the profile of the sealing cord 31c, between the assembly fingers 41, 51 and the contact region 31b. As a result, the assembly fingers 41, 51 are levered, to a certain extent, out of the interspace between the groove 32 and the cord portion 31c of the O-ring 3 and removed from the O-ring 3, with the sealing cord 31 springing out of the retaining grooves 42, 52 and then sitting completely in the peripheral groove 32.

Figure 12:
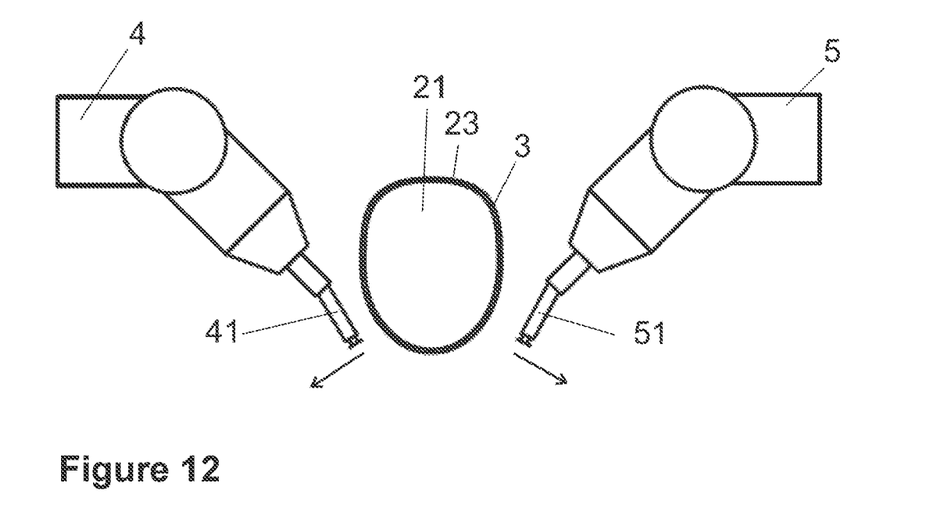

Said end state of the assembly is illustrated in FIG. 12. Component 21 can then be inserted into the housing part 25.

LIST OF REFERENCE DESIGNATIONS

1 Steering shaft
10 Input shaft
12 Output shaft
100 Motor vehicle steering system
102 Steering wheel
103 Steering gear
104 Steering pinion
106 Rack
108 Track rod
110 Wheel
112 Power assistance means
114 Power assistance means
116 Power assistance means
118 Torque sensor
118' Torque sensor
119 Torsion bar
120 Joint
130 Transmission wheel
2 Transmission
21 Component (housing part)
22 Shoulder
23 Groove
24 Housing opening
25 Housing part
3 Annular seal element/O-ring
31 Sealing cord
31a Cord portion
31b Contact region
31c Cord portion
32 Opening
4, 5 Robot manipulator
41, 51 Assembly finger
42, 52 Retaining groove
L Longitudinal axis

What is claimed is:

1. A method for assembling an annular seal element, which is formed by a sealing cord which runs around an opening, on a seal receptacle which runs around on the outside of a component, comprising:
   introducing two assembly fingers into the opening of the annular seal element,
   stretching the annular seal element by moving the assembly fingers apart from one another, with the formation of a cord portion of the sealing cord, said cord portion being freely tensioned between the assembly fingers,
   placing the freely tensioned cord portion onto the seal receptacle in a contact region,
   applying the annular seal element, by way of its opening, onto the seal receptacle, and
   removing the assembly fingers from the annular seal element,
   wherein, for the application of the annular seal element, the assembly fingers are moved so as to follow the profile of the seal receptacle, so as to travel around the seal receptacle in opposite directions.

2. The method of claim 1 wherein during the traveling-around operation, the assembly fingers are moved at a substantially constant spacing from the seal receptacle.

3. The method of claim 1 wherein the assembly fingers are attached to robot manipulators which are configured to be movable independently of one another, along multiple axes.

4. The method of claim 1 wherein at least one assembly finger has a retaining device in which the sealing cord is positioned during the stretching and traveling-around operations.

5. The method of claim 1 wherein, for removal, the assembly fingers are tilted relative to the seal receptacle and the annular seal element.

6. The method of claim 1 wherein the seal receptacle is formed by a groove which runs around on the outside.

7. The method of claim 1 wherein, during the stretching operation, the annular seal element extends substantially parallel to a stretching plane.

8. The method of claim 7 wherein, during the traveling-around operation, the stretching plane is tilted toward the receiving plane.

9. The method of claim 1 wherein the seal receptacle extends substantially parallel to a receiving plane.

10. The method of claim 1 wherein, before the placing-on of the freely tensioned cord portion, the stretching plane is inclined relative to the receiving plane.

* * * * *